United States Patent [19]

Nomura et al.

[11] Patent Number: 4,660,113
[45] Date of Patent: Apr. 21, 1987

[54] MAGNETORESISTIVE THIN FILM HEAD

[75] Inventors: Noboru Nomura, Kyoto; Yasuharu Shimeki, Osaka, both of Japan

[73] Assignee: Matsushita Electric Industrial Co., Ltd., Osaka, Japan

[21] Appl. No.: 448,058

[22] Filed: Dec. 9, 1982

[30] Foreign Application Priority Data

Dec. 9, 1981 [JP] Japan ............... 56-196910
Aug. 17, 1982 [JP] Japan ............... 57-142519

[51] Int. Cl.$^4$ ............... G11B 5/30
[52] U.S. Cl. ............... 360/113; 324/252; 338/32 R
[58] Field of Search ............... 360/113, 124, 125; 338/32 R; 324/252

[56] References Cited

U.S. PATENT DOCUMENTS

| | | | |
|---|---|---|---|
| 3,019,125 | 1/1962 | Eggenberger et al. | 360/131 X |
| 3,232,787 | 2/1966 | Bennett | 117/107.2 |
| 4,040,113 | 8/1977 | Gorter | 360/113 |
| 4,271,438 | 6/1981 | Cornell | 360/32 |
| 4,361,805 | 11/1982 | Narimatsu et al. | 324/252 X |
| 4,394,699 | 7/1983 | Kaminaka et al. | 360/113 |
| 4,477,794 | 10/1984 | Nomura et al. | 338/32 R |

Primary Examiner—Stuart N. Hecker
Assistant Examiner—Benjamin E. Urcia
Attorney, Agent, or Firm—Burgess, Ryan & Wayne

[57] ABSTRACT

A magnetoresistive type thin film magnetic head is completely unaffected by external noise and produces only low interference with a recording medium. A magnetoresistive element which constitutes the thin film magnetic head has three terminals constituted by two end terminals and an intermediate terminal. Constant currents which flow in opposite directions are respectively supplied to the two end terminals. A magnetic field of a signal recorded on and reproduced from a single track of the recording medium is applied to the magnetoresistive element, and reproduction outputs of opposite phases appear at the two end terminals. These outputs are differentially amplified by a differential amplifier. Furthermore, the magnetoresistive element is biased by an induced magnetic anisotropy means in a predetermined direction.

6 Claims, 7 Drawing Figures

LAPPING SCRATCH

MAGNETORESISTIVE THIN FILM HEAD

BACKGROUND OF THE INVENTION

I. Field of the Invention

The present invention relates to a thin film magnetic head of a magnetoresistive type to be used for recording and playing back a digital signal.

II. Description of the Prior Art

Conventionally, a magnetoresistive head (to be referred to as an MR head) has been proposed which comprises a magnetoresistive element (to be referred to as an MR element hereinafter) of a thin strip-shaped ferromagnetic plate.

The MR head is generally mounted together with a thin magnetic induction recording head in the same tape deck, or is deposited together with the thin magnetic induction recording head on the same substrate. In either case, these heads are arranged to be adjacent to each other. However, "feed through" occurs wherein a recording current is mixed in a reproduction output, so that a data signal may not be reproduced by a "real time" monitor which monitors recording sounds. When a shield type MR head having magnetic gaps at two sides of the MR element is used to decrease the feed through signal and to perform short-wave signal reproduction, a constant external magnetic field must be intense enough to bias the MR element since the MR head is shielded. As a result, the signals recorded on the recording medium are demagnetized. Furthermore, the shielding effect is not sufficient to prevent feed through. Therefore, the recording sounds cannot be simultaneously monitored in practice.

In an MR head adopting a shunt bias method which is one of several current bias methods, strict requirements are demanded such as uniformity of the element, uniformity of the recording signals, and azimuth alignment which gives rise to problems in interchangeability among equipment, as compared with requirements of a head having any other structure. Furthermore, thermal noise inherent to the MR element often occurs, thus resulting in an impractical MR head.

SUMMARY OF THE INVENTION

It is, therefore, an object of the present invention to provide a thin film magnetic head wherein a reproduction output is obtained which is not substantially influenced by external noise, azimuth alignment can be easily performed, and thermal noise may not occur.

In order to achieve the above object of the present invention, three terminals are arranged for an MR element. A central or intermediate terminal serves as a comparison terminal. Constant currents having opposite polarities respectively flow in the two end terminals to obtain two reproduction outputs of opposite phases. The outputs are then differentially amplified by a differential amplifier to eliminate external noise signals applied to the head or from the head to the wiring. Furthermore, according to the present invention, a bias method using induced magnetic anisotropy is adopted to eliminate interference between the recording medium and the thin film head. In other words, demagnetization of the recording medium, thermal noise inherent to the MR head and the like are eliminated.

Other objects, features and advantages will be apparent from the following detailed description taken in conjunction with the accompanying drawings.

DETAILED DESCRIPTION OF THE PRIOR ART

Figure 1:
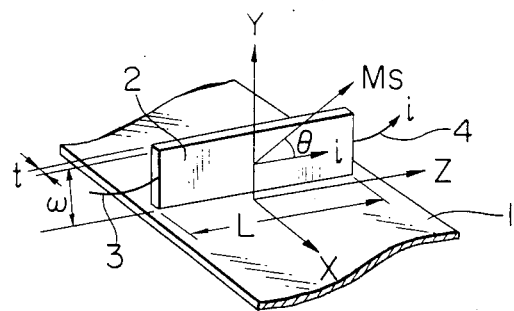
FIG. 1 is a view showing a conventional magnetoresistive playback head.

FIG. 1 shows a conventional MR playback head. An MR element 2 which comprises a thin ferromagnetic plate is formed in a strip shape. The MR element 2 is disposed perpendicular to a magnetic recording medium 1 and is brought into contact therewith or into close proximity therewith. Electrodes 3 and 4 are connected to the two ends respectively along the longitudinal direction (Z-axis) of the MR element 2. Current i flows in the electrodes 3 and 4. A resistive change along the X-axis due to a signal magnetic field along the Y-axis from the magnetic recording medium 1 is detected by a change in voltage between the electrodes 3 and 4. However, the MR head of the type described above has the above-mentioned drawbacks and cannot be used in practice.

Figure 2:
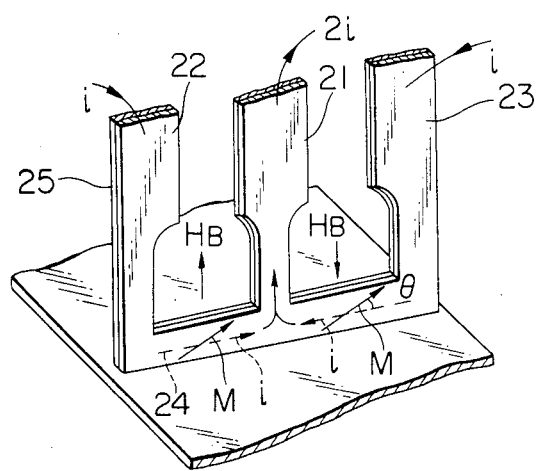
FIG. 2 is a view showing a magneto-resistive head adopting the shunt bias method.

FIG. 2 shows an MR element adopting the shunt bias method. The shunt bias method provides shielding used in reproducing short wave signals. An MR element 24 has three terminals 21, 22 and 23, and the terminal 21 serves as a common ground terminal. The MR element 24 is short circuited by a resistive element 25 of titanium or the like. The MR element 24 is biased by supplying a current to the resistive element 25. Constant current i respectively flows in the terminals 22 and 23, and further flows to the common ground terminal 21. Bias magnetic fields $H_B$ which oppose each other are applied to the MR element 24, as shown in FIG. 2. As has been described earlier, currents of opposite directions flow at a portion between the terminals 21 and 22 and at a portion between the terminals 21 and 23. In this condition, a signal magnetic field is applied in the opposite phases to these portions of the MR element 24. If a difference between voltages appearing at the electrodes 22 and 23 exits, the output would be underbiased in the shunt bias method. Basically, one output is underbiased and a distortion occurs in the reproduction output, the other output cancels the distortion component of the one output, thus providing excellent output. Furthermore, external noise is also cancelled. However, strict requirements are demanded such as uniformity of the element, uniformity of the recording signal, and azimuth alignment which gives rise to problems in interchangeability among equipment as compared with requirements of a head having any other structure. Therefore, an MR head of this type cannot be used in a variety of applications. Furthermore, since current flows in both the MR element and the resistive element, thermal noise inherent to the MR element often occurs, resulting in an impractical MR element.

DETAILED DESCRIPTION OF THE PREFERRED EMBODIMENTS

Figure 3:
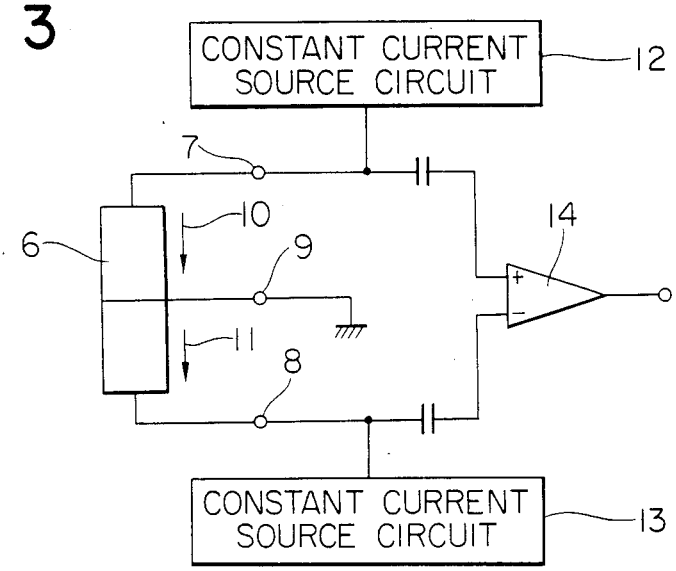
FIG. 3 is a circuit diagram of a thin film magnetic head according to a first embodiment of the present invention.

FIG. 3 is a circuit diagram of a thin film magnetic head according to an embodiment of the present invention. Three terminals 7, 8 and 9 are arranged for an MR element 6 to flow a current thereto and to obtain a reproduction output. Among the terminals 7, 8, and 9, the central or intermediate terminal 9 serves as a ground terminal. If a number of MR elements are used, the terminal 9 may serve as a common ground terminal to decrease the number of terminals to be wired. A current flows to the MR element 6 through the terminals 7 and 8, and voltages appear thereat as the reproduction outputs. An MR current 10 flows from a constant current source circuit 12 to the ground terminal 9 through the terminal 7. An MR current 11 flows from a constant current source circuit 13 to the ground terminal 9 through the terminal 8. The MR currents 10 and 11 are set to the same value. The magnetic field generated by signals which are recorded on and reproduced from a single track of the magnetic recording medium is reproduced by the MR element 6 which is divided into two parts by the intermediate terminal 9. Although resistances in respective portions of the MR element may change, the resistances of the terminals 7 and 8 change in the same direction. The MR currents 10 and 11 flow in opposite directions with respect to the terminals 7 and 8, which also serve as signal output terminals, respectively. The reproduction voltages appearing at the terminals 7 and 8 thus have opposite phases with respect to each other. The outputs at the terminals 7 and 8 are respectively supplied to the positive and negative terminals of a differential amplifier 14 to obtain a reproduction output from the MR element 6. In the above embodiment, the bias magnetic field is applied by means of an external magnet or a current.

An external noise signal such as feedthrough of the recording current in the reproduction output is mixed in the head and flows from the head to ground through wiring. In other words, the external noise is mixed in the MR element portion on the side of the terminal 7 and in the corresponding wiring. The external noise having the same phase as that mixed in as described above is mixed in the MR element portion on the side of the terminal 8 and in the corresponding wiring. Therefore, when the outputs are differentially amplified by the differential amplifier 14, noise components thereof cancel each other out. Thus, the external noise element is not mixed in the amplifier output. On the other hand, the reproduction signal components have opposite phases at the terminals 7 and 8 since the corresponding MR currents flow in different directions. When the reproduction signal components are differentially amplified, the reproduction signal components do not cancel out each other and appear at the amplifier output. As a result, a reproduction output which is unaffected by external noise can be obtained.

Figure 4:
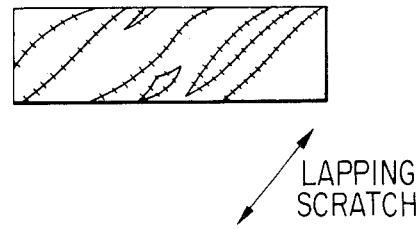
FIG. 4 is a view showing induced magnetic anisotropy of a magnetoresistive element according to a second embodiment of the present invention.

In order to effectively practice the present invention, a thin film MR head according to a second embodiment of the present invention is shown in FIG. 4. The thin film MR head substantially prevents generation of noise. The thin film MR head according to the second embodiment provides a high S/N ratio. FIG. 4 is a side view of the MR element of the above embodiment.

Here, the MR head is biased in the optimal direction by induced magnetic anisotropy, whereas the MR element in the first embodiment is biased by an external means such as an external magnet or an external current. The induced magnetic anisotropy according to the second embodiment is provided in the following manner. When the surface of the substrate on which the MR element is deposited is unidirectionally polished by a lapping tape, the surface is anisotropically roughened in a predetermined direction along the lapping scratches. The magnetic domains are generated to be parallel with the lapping scratches, and the magnetic moments thereof are uniformly directed, thus obtaining the induced magnetic anisotropy. The lapping scratches have random pitches and depths. In this sense, reproducibility of the lapping scratches is very poor. However, using photoresist grating obtained by laser holography, the substrate surface may be etched by sputter etching or ion milling to obtain uniform grooves, that is, an indentation pattern with excellent reproducibility. The induced magnetic anisotropy of the MR element formed on the substrate obtained in the above process also has excellent reproducibility and uniformity. As a result, an intense anisotropic magnetic field can be obtained.

Since single crystals of quartz ($SiO_2$), rutile ($TiO_2$), $Al_2O_3$ and the like give rise to anisotropic characteristics in thermal expansion factors in accordance with the crystallographic axis, as shown in the table below, a substrate made of one of the above materials is anisotropically thermally shrunk after an MR element is thermally deposited thereon.

TABLE

| Material | $\alpha \parallel C$ | $\alpha \perp C$ | Measuring Temp. (° K.) |
| --- | --- | --- | --- |
| Quartz ($SiO_2$) | 7.0 | 12.9 | 300 |
| Rutile ($TiO_2$) | 8.8 | 6.9 | 273 |
| $Al_2O_3$ | 5.5 | 4.6 | 273 |
| Be | 9.1 | 12.6 | 300 |
| Graphite (C) | 27.3 | −0.5 | 300 |
| CdS | 4.0 | 6.5 | 313 |
| Zr | 6.9 | 4.7 | 300 |
| Mg | 26.5 | 25.1 | 300 |
| Sr | 16.2 | 8.3 | 300 |

Since the above-mentioned thermal shrinkage has an anisotropic characteristic, anisotropic magnetostriction occurs in the MR element, thus obtaining induced magnetic anisotropy due to magnetostriction.

Figure 5:
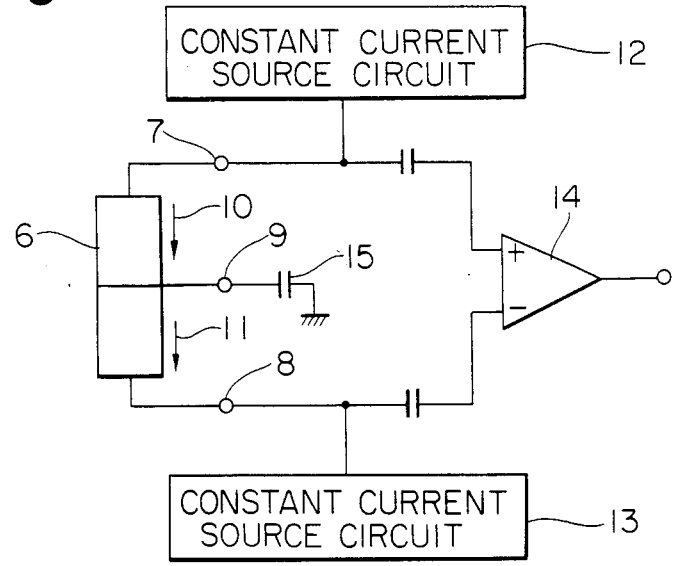
FIG. 5 is a circuit diagram of a thin film magnetic head according to a third embodiment of the present invention.

FIG. 5 is a circuit diagram of an MR head according to a third embodiment of the present invention. The MR head of this embodiment is substantially the same as that of the first embodiment, except that a terminal 9 among three terminals 7, 8 and 9 which receive MR currents from current sources and produce reproduction outputs is grounded through a capacitor 15 in an AC manner. Referring to FIG. 3 again, external noise is eliminated since the MR element is symmetrical about the ground (intermediate) terminal 9 and since the MR current does not flow in the intermediate terminal 9. However, if the intermediate terminal 9 is grounded in a DC manner without satisfying the above condition, the MR currents flow in the intermediate terminal 9. Therefore, the external noise components are not symmetrically distributed with respect to the intermediate terminal. As a result, the external noise may not be completely eliminated.

In the MR head shown in FIG. 5, the intermediate terminal 9 is grounded through the capacitor 15 in an AC manner even if the voltage at the intermediate terminal 9 changes in a DC manner because of nonsymmetrical application of voltages from the power source and nonsymmetrical distribution of the MR element. Therefore, the external noise component of the AC component is grounded through the intermediate terminal 9.

Since the MR currents flow in opposite directions with respect to the intermediate terminal 9, and since outputs of opposite phases appear at the terminals 7 and 8 respectively, the reproduction output components may not cancel each other when they are amplified by the differential amplifier 14. As a result, a reproduction signal which is unaffected by the external noise can be obtained.

Figure 6:
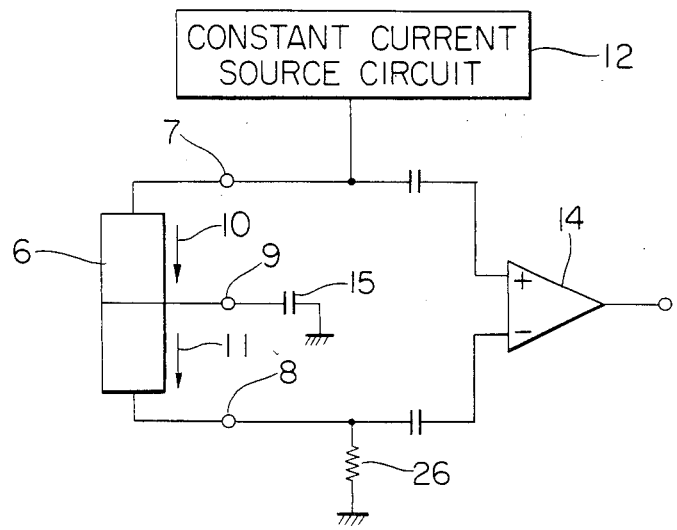
FIG. 6 is a circuit diagram of a thin film magnetic head according to a fourth embodiment of the present invention.

FIG. 6 is a circuit diagram of an MR head according to a fourth embodiment of the present invention. The MR head of the fourth embodiment is substantially the same as that of the third embodiment, except that a terminal 8 is grounded through a resistor 26. The resistance of the resistor 26 is the same as an equivalent output impedance of a constant current source circuit 12 connected to a terminal 7. The constant current source circuit 12 supplies MR currents 10 and 11 from the terminal 7 to ground through the terminal 8 and the resistor 26. Since a terminal 9 is AC grounded, the MR currents 10 and 11 are regarded as the same currents. Although the resistance of the MR element is changed by the signal magnetic field from the magnetic recording medium, voltages at the terminals 7 and 9 drop when the resistance of the MR element is decreased, since MR currents are constant. However, since the terminal 8 is kept at a constant potential, a change in potential at the terminal 7 is twice a change in potential at the terminal 9. As may be apparent from the above description, a change in voltage at the terminal 7 with respect to the terminal 9, that is, the reproduction output appearing at the terminal 7, has the opposite phase to that of the reproduction output appearing at the terminal 9, that is, to a change in voltage at the terminal 8 with respect to the terminal 9.

Since the external noise component such as feedthrough of the recording signal into the reproduction output is an AC component, the external noise component is mixed in so as to flow in the head and from the head to the AC ground through wiring. The external noise component mixed in the MR element portion on the side of the terminal 7 and in its corresponding wiring has the same phase as the external noise component mixed in the MR element portion on the side of the terminal 8 and in its corresponding wiring.

Figure 7:
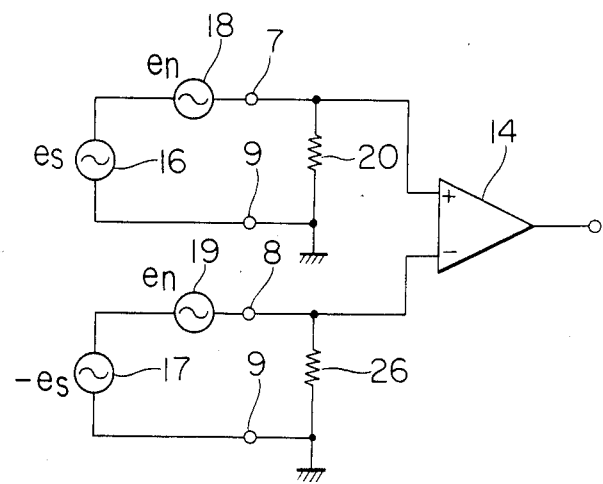
FIG. 7 is a circuit diagram showing an equivalent circuit of the circuit shown in FIG. 6.

A small signal equivalent circuit having the same arrangement as the circuit shown in FIG. 6 is shown in FIG. 7. A signal source 16 is arranged on the side of the terminal 7 of the MR element 6 and generates a signal $e_s$. A noise source 18 produces external noise $e_n$. The constant current source is represented by a resistor 20 having the same resistance as the internal impedance. A signal source 17 is arranged on the side of the terminal 8 and generates a signal $-e_s$ which has a phase opposite to that of the signal $e_s$. A noise source 19 produces external noise $e_n$ having the same phase as the external noise produced on the side of the terminal 7. The impedances on the sides of the terminals 7 and 8 are the same, so that the external noise is expressed as $e_n$ on the sides of both terminals 7 and 8. When two output signals arising at the terminals 7 and 8 are supplied to a differential amplifier, the noise components cancel each other, and only the signal component is obtained as $2e_s$. The reproduction signal is thus unaffected by the external noise components. Furthermore, according to the above embodiment, only one constant current source is required, resulting in simple circuit configuration.

What is claimed is:

1. A thin film magnetic head having a magnetoresistive element in which a thin ferromagnetic film is deposited on a substrate, wherein said magnetoresistive element has three terminals comprising two end terminals connected to means for providing a current flowing through the magnetoresistive element in one direction and an intermediate terminal connected to grounding means and the magnetization of the magnetoresistive element is preset by magnetization presetting means to be substantially inclined in one direction against the longitudinal direction of the magnetoresistive element; a change in resistance of a first portion between one of said two end terminals and said intermediate terminal and a change in resistance of a second portion between the other of said two end terminals and said intermediate terminal which are obtained by applying a magnetic field of a signal recorded on and reproduced from a single track of a magnetic recording medium are respectively obtained as reproduction voltages by flowing a current through said first and second portions in the same direction; and the two end terminals are connected to a differential amplifier which differentially amplifies the reproduction voltages.

2. A thin film magnetic head of claim 1 having a magnetoresistive element in which a thin ferromagnetic film is deposited on a substrate, wherein said magnetoresistive element has three terminals constituted by two end terminals and intermediate terminal and wherein the magnetization is preset by induced magnetic anisotropy produced in said magnetoresistive element.

3. A thin film magnetic head of claim 1 having a magnetoresistive element in which a thin ferromagnetic film is deposited on a substrate, wherein said magnetoresistive element has three terminals constituted by two end terminals and an intermediate terminal and wherein the magnetization is preset by induced magnetic anisotropy produced in said magnetoresistive element by a linear indentation pattern formed on at least one surface of said magnetoresistive element.

4. A head according to claim 2, wherein said induced magnetic anisotropy is produced by an anisotropic characteristic of a thermal expansion coefficient of said substrate and by magnetostriction incurred in said magnetoresistive element formed thereon.

5. A thin film magnetic head having a magnetoresistive element in which a thin ferromagnetic film is deposited on a substrate, wherein said magnetoresistive element has three terminals constituted by two end terminals and an intermediate terminal, and means providing a low AC impedance between said intermediate terminal and a source of reference potential, and is biased to be magnetized in one direction; a change in resistance of a first portion between one of said two end terminals and said intermediate terminal and a change in resistance of a second portion between the other of said two end terminals and said intermediate terminal which are obtained by applying a magnetic field of a signal recorded on and reproduced from a single track of a magnetic recording medium are respectively obtained as reproduction voltages by flowing a current through said first and second portions in the same direction; and the reproduction voltages are differentially amplified.

6. A head according to claim 5, wherein the one of said two end terminals formed at said magnetoresistive element is grounded through a resistor, whereas the other of said two end terminals receives a current.

* * * * *